UNITED STATES PATENT OFFICE.

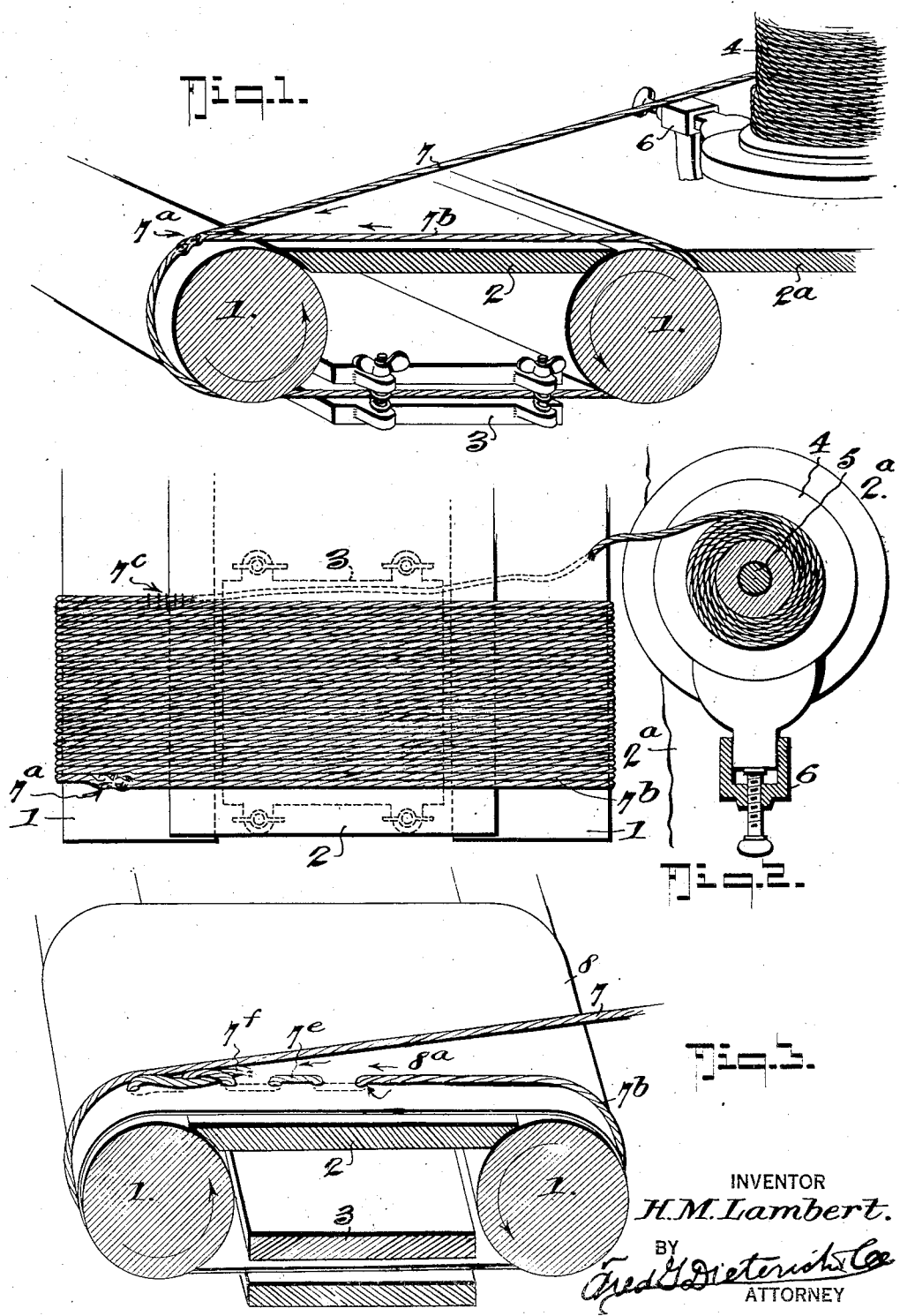

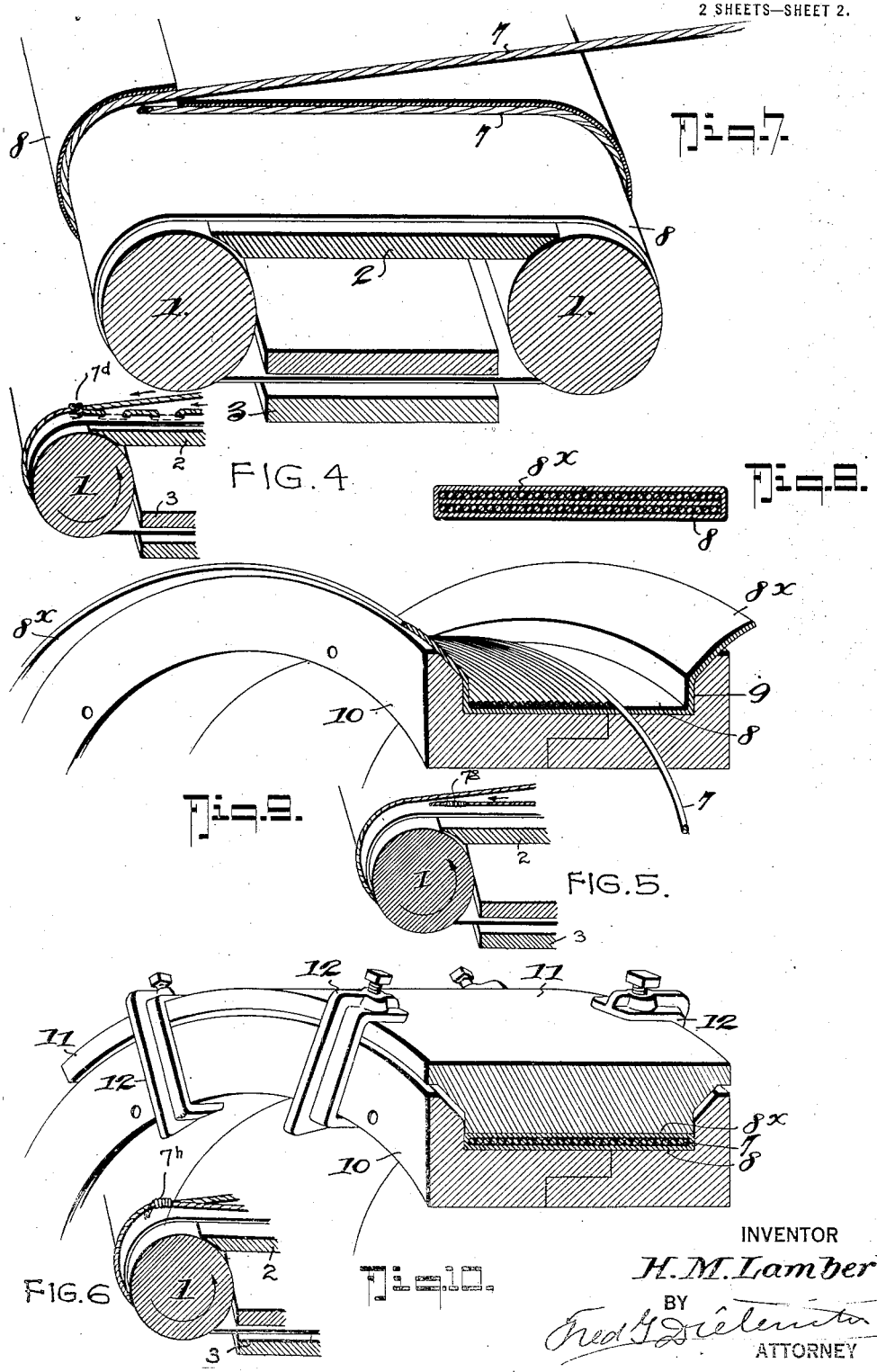

HENRY M. LAMBERT, OF PORTLAND, OREGON, ASSIGNOR TO LAMBERT TIRE & RUBBER COMPANY, OF PORTLAND, OREGON, A CORPORATION OF ARIZONA.

METHOD OF MANUFACTURING STRETCHLESS BELTING.

1,412,309. Specification of Letters Patent. Patented Apr. 11, 1922.

Application filed June 4, 1918. Serial No. 238,203.

*To all whom it may concern:*

Be it known that I, HENRY M. LAMBERT, a citizen of the United States, at present residing at Portland, in the county of Multnomah and State of Oregon, have invented a new and Improved Method of Manufacturing Stretchless Belting, of which the following is a specification.

My invention relates to the art of belting manufacturing and it particularly has for its object the provision of a practical method of manufacturing stretchless corded belting in such way that the belt may be rendered substantially and practically completely stretchless before vulcanization, and maintained in that condition while being subjected to the vulcanization process in order to "set" the belt, so that it will maintain its stretched state on completion of the manufacturing process.

In the preferred embodiment of my process, a continuous cord is helically wound on a circular former, or on suitably spaced rollers, to form the belt of the desired width and length, the cord being subjected to elongating strains, while being laid, to such an extent that the cord is stretched to its approximate limit of elongation as it is wound on the rollers or former (the ends of the cords being preferably permanently fastened); the cord may be rubberized before being laid, if desired, and, after the cord is laid, in the manner above stated, the assembled loops are vulcanized together, under pressure, while still on the rollers or former, thus retaining the cords against retractionary or rebounding strains that would tend to shrink or retract the cords from their maximum stretched condition.

Various modifications of the method may be employed, depending upon the conditions met with in practice and having relation to the purpose for which the belt is to be used.

In the drawings, I have shown several methods of utilizing my invention and, by reference to the drawings, it will be observed that Figure 1 is a diagrammatic perspective view illustrating one way of carrying out my method.

Figure 2 is a top plan view of the parts shown in Figure 1, the cord carrying spool being shown in section and the cord severed from the wound portion of the cord and illustrating a brake arrangement for imparting the necessary tension to the cord to effect the required stretch.

Figure 3 is a diagrammatic perspective view showing another way of employing my method.

Figure 4 is a view similar to Figure 3, showing another way of securing the first end of the cord.

Figures 5 and 6 are diagrammatic views similar to Figure 3, showing still other ways of securing the end of the cord in starting up the winding process.

Figure 7 is a diagrammatic perspective view illustrating another way of employing the method in the manufacture of belting.

Figure 8 is a cross section of the finished belt, made up of a plurality of layers of canvas and cords.

Figure 9 is a detail perspective view of a portion of a circular former on which the belt can be built up in forming the belting layers or tires.

Figure 10 shows how the parts may be vulcanized, when made on the circular former of Figure 9.

In carrying out my improved method, if it is desired to manufacture a belt composed only of cords embedded in a suitable agglutinant and vulcanized, I may proceed as indicated in Figure 1, by reference to which it will be observed that there is provided a pair of rollers 1—1, spaced a suitable distance apart, between which there is a table 2 and a vulcanizer 3. I take a spool of cord 4, mounted on a suitable spindle 5 on the table portion $2^a$, and loop the cord around the rollers 1—1, drawing the loop as taut as possible without breaking it and securing the end of the cord to the adjacent part of the cord to form a closed loop. The manner in which the end of the cord is secured may be varied as desired. In Figure 1, it is shown as spliced in as at $7^a$, the loop being indicated by the numeral $7^b$ and the cord strand by 7. Any suitable means is provided for imparting rotation to the rollers 1—1, in the direction of the arrow, at a uniform speed, thus causing the cord 7 to be drawn around and laid spirally in adjacent loops, as indicated in Figure 2.

In order to take out all of the stretch of the cord, that is to stretch it to its approximate limit of elongation (within a few degrees of its breaking point), tension must be applied to the cord 7, as it is being laid and this may be accomplished in any desired way.

For convenience of illustration, I have shown a brake device 6 cooperative with the spool 4 which provides the necessary retardation of the moving of the spool to allow the cord 7 to be stretched as stated.

As soon as sufficient cord has been wound to form a belt of the desired width, the last loop of the cord is secured to the adjacent loop in any desired way, either by sewing as indicated at 7ᵉ in Figure 2, or knotted and tied, or fastened in any other permanent way as may be found convenient, as indicated in the other figures of the drawings for the manner of securing the first end of the cord.

In making up the belt, however, it is usually found desirable to build up a belt structure of alternate layers of fabric and cord and this is particularly useful in tire making.

When it is desired to build up a belt of alternate layers of fabric and cord, the fabric 8 is first stretched around the rollers or former and the end of the cord looped to form a loop 7ᵇ as before, the end being secured as at 7ᵃ in Figure 1, by splicing, or tied as at 7ᵈ in Figure 4, or fastened as at 7ᵉ in Figure 3 by fastening it through holes 8ᵃ in the fabric and looping it back as at 7ᶠ in Figure 3, or it may be sewn to the fabric as indicated at 7ᵍ in Figure 5 or tied to the adjacent part of the loop as at 7ʰ in Figure 6, so long as the end is secured in a permanent way.

The cord is then wound over the layer of fabric 8 until a belt of the desired width is obtained, it being understood, however, that tension is applied to the cord as in Figure 1, to stretch it to its approximate limit of elongation while being laid.

After the desired number of convolutions of cord have been laid, to form a belt of the required width, the cord is fastened to the adjacent loop and cut as indicated in Figure 2 and as before described.

The vulcanizer 3 is, of course, kept open during the laying of the cord loops and, after the desired number of cord loops have been laid, or layers of fabric 8 and cord 7 have been laid, the vulcanizer can be closed down and heat applied to vulcanize the structure while it is still on the rollers or former, the vulcanizing being effected, if desired, in sections, that is the vulcanizer can be made to take in only a section of the belting, as indicated in the drawings.

When desired, the first layer of canvas 8 can be made of greater width than the finished belt, so that it can be doubled back over the other layers of corded fabric, as indicated at 8ˣ in Figures 8, 9 and 10.

In making the belting for use on tires, a rotary former 10 is preferably employed and this former is provided with a channel 9 of the desired size to form a belt or annulus of the required width. The canvas 8 is laid around the periphery of the former 10 in the channel 9 and the cord 7 wound thereon while being stretched to its approximate limit of elongation, as above indicated.

After the desired number of cord convolutions have been wound on, the fabric can be folded over as at 8ˣ and a cap plate 11 can be clamped in place by clamps 12 and the entire structure subjected to heat for vulcanization purposes.

The cord 7 may be impregnated with an agglutinant such as rubber or other suitable material during its manufacture, or ordinary cord may be employed and, after the cord has been wound as indicated in the drawings, the same may be covered or immersed in a viscous agglutinant and subsequently vulcanized.

I prefer, however, to employ a cord which has been previously impregnated with the agglutinant as in that manner, a more complete permeation of the agglutinant in the interstices of the cord body is obtained, so that, when subjected to vulcanization, the agglutinant in the cord will become set as well as the agglutinant between adjacent loops of the cord and thus prevent the cord from shrinking or rebounding, due to its inherent elasticity.

By vulcanizing the structure while on the former, the cord may be maintained in its stretched condition until the vulcanization is complete.

I prefer to vulcanize under pressure as more satisfactory results can be obtained thereby than with a mere heat vulcanization without pressure.

The fabric and cord belt structure made by my method is especially useful in the manufacture of stretchless corded tires having belt sections, such for instance as shown in my application Serial No. 200,478, filed November 6, 1917.

In my application filed July 28, 1914, Serial No. 853,617, I have disclosed a method of manufacturing corded belts and also laid claim to the article produced thereby. In that application, the method claims were cancelled for purposes of division and the application limited to the article claims.

In so far as this application contains the matter divided out of that application, and contains divisible matter in common with that application, the present application may be considered a continuation in part thereof.

It will be noted that when the belting is made in a channel, such as the channel 9, it can be subjected to pressure in a direction normal to its peripheral surface, by any suitable means, as for instance, the plate 11, which thus confines the belt in a closed channel during the application of pressure and enables the parts to be put under pressure within confined limits so that the agglutinant may be evenly distributed within the confines. Any other suitable distributing means for this purpose can be employed, as for instance the means shown in my previous application above referred to.

From the foregoing description taken in connection with the accompanying drawings, it is thought that my method will be readily understood by those skilled in the art and its advantages and benefits duly recognized.

What I claim is:—

1. The method of manufacturing stretchless corded belting which consists in taking a cord, stretching it to its approximate limit of elongation and simultaneously laying the cord in a plurality of adjacent convolutions, imbedding the whole in an agglutinant and vulcanizing the same.

2. The method of manufacturing stretchless corded belting which consists in taking a cord, stretching it to its approximate limit of elongation and simultaneously laying the cord in a plurality of adjacent convolutions, imbedding the whole in an agglutinant and vulcanizing the same, under pressure, while restraining the cord against rebounding during the process of vulcanization.

3. The method of manufacturing stretchless corded belting which consists in taking a cord, stretching it to its approximate limit of elongation and simultaneously laying the cord in a plurality of adjacent convolutions, restraining the cord from rebounding after being laid and imbedding the whole in rubber or other suitable agglutinant, and vulcanizing the same.

4. The method of making endless belting which consists in arranging one end of a cord in a loop, stretching the cord of the loop to approximately its limit of elongation and securing the terminal end thereof to close the loop, causing said closed loop to move in an endless path and draw thereafter the cord to form closely assembled convolutions, applying tension to the cord as it is being drawn to stretch the same to its approximate limit of elongation while being laid, and imbedding the whole in an agglutinant and vulcanizing the same.

5. The method of making endless belting which consists in arranging one end of a cord in a loop and securing the terminal end thereof permanently to close the loop, causing said closed loop to move in an endless path and draw thereafter the cord to form a plurality of closely assembled convolutions, applying sufficient tension to the cord as it is being drawn to stretch the same to its approximate limit of elasticity while being laid, imbedding the whole in an agglutinant and vulcanizing the same, under pressure, while maintaining the cord stretch during the process of vulcanization.

6. The method of manufacturing belting which consists in providing a closed loop of fabric, holding said loop in a definite form to define the size of the belting desired, laying a layer of cord on said fabric loop in a spiral form while subjecting the cord to sufficient tension to stretch the same to its approximate limit of elongation while being laid, subjecting the adjacent cord loops and the fabric to treatment to cause their adhesion and to restrain the cord against rebounding.

7. The method of manufacturing belting which consists in providing a closed loop of fabric, holding said loop in a definite form to define the size of the belting desired, laying a layer of cord on said fabric loop in a spiral form while subjecting the cord to sufficient tension to stretch the same to its approximate limit of elongation while being laid, impregnating the cord and fabric with an agglutinant and vulcanizing the same while holding the cord against rebounding.

8. The method of manufacturing a belt which consists in providing a base layer of fabric, holding said base layer of fabric under tension, winding a cord helically on said base layer of fabric, maintaining said cord under a sufficient tension to stretch the same to approximately its limit of elongation while being laid and imbedding said cord in an agglutinant and permanently uniting the same to the base layer by vulcanization.

9. The method of manufacturing a belt which consists in providing a base layer of fabric, holding said base layer of fabric under tension, winding a cord helically on said base layer of fabric, stretching said cord under strong tension while being laid, maintaining the cord stretched under such tension, embedding the cord in an agglutinant and permanently uniting the cord together and to the base layer by vulcanization.

10. The method of manufacturing belting which consists in providing a closed loop of fabric, holding said loop in a definite form to define the size of the belting desired, laying a layer of cord on said fabric loop in a spiral form while subjecting the cord to sufficient tension to stretch the same to its approximate limit of elongation while being laid, subjecting the adjacent cord loops and fabric to an adhesive and to treatment to cause their adhesion and to restrain the cord against rebounding.

11. The method of manufacturing stretchless corded belts which consists in taking a cord, stretching it under strong tension and simultaneously laying the cord in a plurality of adjacent convolutions, embedding the whole in an agglutinant and vulcanizing same while the cord remains under tension.

12. The method of making a flat, endless belt which consists in laying a fabric cover strip on the periphery of a forming support, winding cord thereon under strong tension in a series of adjacent convolutions, associating a vulcanizable material with the fabric and cord, closing the cover strip over the outer side of the body of cord strands, and vulcanizing the article while still under tension in place on the support.

HENRY M. LAMBERT.